ପ2,696,426

PROCESS FOR THE PREPARATION OF IRON OXIDE PIGMENTS

Guy C. Marcot, Lynchburg, Va., assignor to American Cyanamid Company, New York, N. Y., a corporation of Maine No Drawing. Application May 4, 1951, Serial No. 224,665

19 Claims. (Cl. 23—200)

The present invention is a continuation-in-part of patent application Serial Number 767,070 by G. C. Marcot et al., filed August 7, 1947, now Patent No. 2,558,303, granted June 26, 1951.

The present invention relates to a novel process for the selective production of two types of iron oxide pigments: one, a pigment of the goethite type having a yellowish shade, and the other a pigment of the hematite type having a reddish shade. More particularly, the present invention relates to a novel, direct and highly economical process for producing these two types of pigments as crystalline particles. The present invention is not limited to the production of these pigments in opaque form, but extends to their production in more microcrystalline, apparently transparent form as well.

The parent case was broadly concerned with the control of transparency, degree of crystallinity, and particle size, but did not solve the problems of control of the type of crystals produced. The discovery has now been made that the novel hereinafter described modifications of the method of the parent application permit selective production of both the yellow goethite or the hematite pigment, as may be desired. These pigments are recovered from the process in a microcrystalline form, and, depending on the type of process controls employed, may appear either transparent or opaque when pigmented in a transparent film.

Broadly, according to the present invention, a crystalline iron oxide pigment is produced by forming an aqueous solution of a soluble ferrous salt; forming an aqueous solution of an alkali metal carbonate more than stoichiometrically equivalent to said ferrous salt; adding said ferrous salt solution to said carbonate solution at a temperature below 45° C.; oxidizing the ferrous content of the mixture below 45° C.; and heating the slurry which results to about 80° C. until conversion is substantially complete.

According to one embodiment of the present invention, crystalline pigmentary goethite having a yellow shade is produced by forming an aqueous solution of a soluble ferrous salt; forming an aqueous solution of an alkali metal carbonate more than stoichiometrically equivalent to said ferrous salt; adding said ferrous salt solution to said carbonate solution at a temperature below 45° C.; oxidizing the ferrous content of the mixture between about 25° and 45° C.; and heating the slurry which results to above 80° C. until formation of pigmentary goethite is substantially complete.

According to another embodiment of the present invention, a crystalline pigmentary hematite having a red shade is produced by substantially freeing a stable solution of a soluble ferrous salt from particles including colloidal particles, the concentration of said salt in said solution being equivalent to at least about 80 g./l. of FeOOH; forming an aqueous solution of an alkali metal carbonate more than stoichiometrically equivalent to said ferrous salt; adding said ferrous salt solution to said carbonate solution at a temperature below 25° C.; oxidizing the ferrous content of the mixture below 25° C.; and heating the slurry which results to above 80° C. until formation of pigmentary hematite is substantially complete.

The pigment of the present invention having the yellow shade corresponds chemically to a goethite compound of the formula $\alpha$-FeOOH, and the pigment having the red shade corresponds chemically to a compound of the formula $\alpha$-Fe$_2$O$_3$. It will be understood by those skilled in the art, however, that these formulae do not completely describe the pigments of the present invention. When prepared as dry powders, both pigments are thermostable, the yellow form remaining unchanged in color when heated up to about 150° C., and the red form when heated considerably higher. Aqueous slurries of these pigments may be dried at 100° C. without harm, as compared with the maximum temperatures of about 40°–50° C. prescribed for the drying of the pigments of the parent application.

The process of the present invention has several distinct advantages. In the first place it makes possible the production of transparent red hematite pigment by a direct and highly economical process using only ordinary equipment. Further, it permits the selective production of transparent yellow goethite pigment in substantially the same way, permitting great flexibility in actual operations where it is always desired to hold manipulative changes to a minimum. Then, the pigments produced in accordance with the process of the present invention have very low content of combined anion, running less than 0.2%. Since combined anion content is an index of the tendency of the pigment to agglomerate, this means the process of the present invention permits the production of pigments which can be readily utilized without necessity of subjecting them to complex subsequent treatments.

It is a further advantage of the process of the present invention that even when technical copperas is employed, such as the first crop of copperas precipitated in the manufacture of titanium dioxide, by the sulfate process, the pigments are sufficiently pure to be used as iron oxide catalysts. In this connection it is an advantage that the yellow pigment is thermally stable at temperatures in excess of 150° C. to about 178° C.

Briefly, the red hematite pigment described above is prepared as follows. A solution is made of a ferrous salt, the concentration of the salt being equivalent to at least about 100 g./l. of FeOOH, and the solution is substantially freed of solid matter including colloidal particles. This solution is then poured into a solution of a carbonate more than stoichiometrically equivalent to the ferrous salt solution. An immediate reaction takes place. The ferrous content of the mixture is then oxidized to ferric at a temperature below 25° C. Upon completion of this oxidation, the slurry which forms is boiled until reaction ceases, that is, until conversion of the slurry solids to hematite is at least substantially complete. The hematite pigment is recovered by filtration and drying or by a conventional flushing procedure as may be desired. The mechanism of the formation of the pigment intermediate and conversion of this intermediate upon boiling to the final pigment are not known, and it is not desired that this invention be limited to any particular theory.

More in detail, the ferrous salt preferably is copperas, as this is in most localities a waste product. Ferrous salts of equivalent stability may be used such as ferrous chloride, as well as ferrous nitrate and ferrous ammonium sulfate. Ordinarily, ferrous salt solutions tend to decompose, by oxidation on the one hand and by hydrolysis on the other. Accordingly, access of air should be limited, and the solutions maintained acid to ensure stability. It is important that the initial ferrous salt solutions, be substantially free from solid matter, including colloidal particles. This purification may be performed in any desired manner, but I prefer to destroy or decompose the colloidal matter in situ by acidifying the solutions to pH 2–3 or lower and ageing the solutions at about room temperature for at least several hours. As stated, the concentration of the ferrous salt in the solution should be equivalent to about 100 g./l. of FeOOH. The concentration may be higher with very satisfactory results, and concentrations as low as the equivalent of 80 g./l. of FeOOH have been employed.

As carbonates, sodium carbonate is preferred. Sodium bicarbonate may also be used as well as the corresponding potassium salts. It will be understood that where these bicarbonates are used, two mols will be employed for every calculated mol of carbonate necessary.

The use of other carbonates and bicarbonates is not excluded. The amount of carbonate must be in excess, and a large excess, for example, a 25% excess is preferred. The concentration of carbonate in the solution is not at all important.

The method of addition of the two solutions and the oxidation of the ferrous content to ferric, however, are critical. The ferrous solution must be added to the carbonate solution and not vice versa, and the temperature of the solution, immediately after the mixing and during the oxidation, must be maintained below about 25° C. A temperature at least several degrees lower than this borderline temperature is preferred, and it is simplest to cool the two solutions to about 5°–15° C. before mixing.

Preferably, the oxidation is performed by aeration, but other oxidizing agents including hypochlorites and peroxides may be employed. Ordinarily, air in the form of fine bubbles is passed through the solution. When performed in this manner, the oxidation may require from ¼ hour to ten hours or more, depending chiefly on the volume of air and the reaction temperature. The formation of fine bubbles of air is desired, and this is assisted by the addition of a small amount of any non-reactive surface tension reducing agent.

On mixing, without aeration, a light blue precipitate forms. This darkens upon oxidation, first to almost a black color and then to a dark brown and finally to a reddish brown when oxidation is complete.

When the oxidation of the ferrous content of this precipitate to ferric is substantially complete, the resulting slurry is heated at a temperature well above 80° C. until conversion of the precipitate to hematite is substantially complete. Preferably the slurry is simply boiled, the time required for the conversion being roughly one hour, ranging from about half an hour to as long as about two hours.

In commercial practise, heating the dilute slurry from the low oxidation temperature, which may be 5° C. or lower to the boil, requires a significant expenditure of fuel. This expenditure may be reduced by filtering off the liquid, and repulping the precipitate with a smaller amount of water. When this economy is effected, it is important that the water contain at least a few percent of its weight, for example, 5% or much more, of carbonate.

The hematite is recovered in microcrystalline pigmentary form, either transparent or opaque as may be desired. For the production of transparent pigments, the oxidation is performed rapidly by admission of sufficient air to complete the conversion of the ferrous material to ferric in about ¼ to about 4 hours, and the subsequent boiling is halted as soon as the formation of hematite is substantially complete. Slower oxidations at higher temperatures, and particularly prolongation of the boiling, causes crystal growth and therefore the development of an opaque pigment.

The product is recovered by washing and drying the boiled material. Alternatively, a conventional flushing procedure may be used.

The yellow goethite pigment is produced according to the process of the present invention by modifying the above process for the production of the red hematite pigment. One such modification consists in the employment of a ferrous salt solution which contains colloidal structures. Ordinary ferrous salt solutions which have not been strongly acidified and aged contain these structures. With these solutions the oxidation may be performed in the range 0° C. to 45° C. Where the colloid free ferrous salt solution described above is used, the yellow pigment is obtained by performing the oxidation step at a temperature above about 25° C. but below 45° C., and preferably in the range of 30° C.–40° C. Still another modification resulting in the formation of the goethite pigment consists in performing the heat conversion which concludes the process in the presence of alkali. When this modification is employed, a substantial amount of alkali is necessary. Preferably an amount of sodium hydroxide is added equivalent to the FeOOH equivalent of the slurry solids. These modifications are not mutually exclusive, but may be combined. In general, the same oxidation process is followed.

The remainder of the process is carried out in the same way and the production of transparent pigment being subject to the same controls. As to this, in both goethite and hematite pigment productions, temperatures and times are independent variables, and when low temperatures and minimum reaction times are employed, the formation of transparent pigments results.

The present invention has been fully set forth above. The examples which follow illustrate but do not limit the practise of this invention.

*Example 1*

A stock solution was made by dissolving C. P. copperas in water at 25° C. to a concentration equivalent to 150 g. per liter of FeOOH. This solution was adjusted with sulfuric acid to a pH of 2.3, and aged for 16 hours. 267 ml. of this solution was diluted to 500 ml. with water and added to a solution of 66 g. of soda ash dissolved to 1.5 liters in water at 25° C. The addition was made slowly, over two minutes, with continuous agitation. Agitation was continued for 10 minutes thereafter. The slurry was then aerated at 25° to 27° C. at a rate to give complete oxidation of the $Fe^{++}$ to $Fe^{+++}$ in 1½ hours by introducing air into the slurry through a perforated stocking. The slurry was then gently boiled for 1 hour. After the boiling the color of the slurry was yellow. When subjected to X-ray diffraction analysis the recovered, washed pigment was found to exhibit the diffraction pattern of $\alpha$–FeOOH.

*Example 2*

A second 267 ml. portion of the stock copperas solution of Example 1 was cooled to a temperature of 15° C. and mixed with a solution of 66 g. of soda ash dissolved to 1735 ml. with water at 15° C. The oxidizing procedure of Example 1 was repeated except that the temperature was maintained at 15° to 20° C. After 1 hour of gentle boiling the color of the slurry was red and the washed and dried product, when subjected to X-ray diffraction analysis was found to exhibit the diffraction pattern of $\alpha$–$Fe_2O_3$.

*Example 3*

The pH of a freshly prepared 500 ml. solution of copperas equivalent to 40 g. of FeOOH was reduced to 2.2 by the addition of sulfuric acid, and the solution aged for 3 hours at 6° C. This solution was added with stirring to 72 g. of soda ash dissolved to 1500 ml. with water at 6° C. over a period of about 10 minutes. The mixture was agitated for a further 10 minutes. The oxidation procedure of Example 1 was followed, the temperature being maintained throughout between 6° and 10° C. After completion of the aeration the total volume of the slurry was adjusted to 2500 ml. and boiled for 3 hours. The boiled slurry was then washed by decantation and again made up to 2500 ml. A 315 ml. portion of this slurry equivalent to 5 g. of FeOOH was agitated with 50 ml. of a 20% solution of saponified castor oil. The pH was then reduced to 5.5 whereby the iron oxide was recovered as a flushed paste. When this paste was incorporated in a transparent lacquer, the weight of the pigment being 5% of the weight of the lacquer, the film was transparent and possessed an orange-red color tone.

*Example 4*

The procedure of Example 4 was repeated using, however, 96 g. of soda ash. The color of the pigmented film was an orange-red similar to that of the film of Example 3.

*Example 5*

A stock slurry of pigment intermediate was prepared as follows. 7½ gallons of a copperas solution containing the equivalent of 10 lbs. of FeOOH was prepared and its pH was reduced to 2.0 by the addition of sulfuric acid. The solution was aged for 3 days at 28° C. It was then cooled to 10° C. and mixed with 16 lbs. of soda ash dissolved to 24 gallons of water at 10° C. over a period of 15 minutes. The mixture was stirred for a further period of 15 minutes, the temperature being maintained at 10° C. The solution was then made up to 60 gallons by the addition of cold water and the temperature adjusted 7° C. The slurry was aerated at 7° to 12° C. in 4½ hours, at which time oxidation of the $Fe^{++}$ to $Fe^{+++}$ was then at least 99% complete.

A portion of this slurry was boiled and portions removed for lacquer evaluation after ½ hour, 1 hour, 1½ hours, 2 hours, and 3 hours, as described in Example 3. A pigment of red tone was obtained in each instance which, when examined by X-ray diffraction, exhibited the diffraction pattern of α–Fe₂O₃. From examination of the lacquers obtained it was found that as the duration of the boiling increased, the pigment became redder up to two hours, and that after that time there was no significant color change but the pigment became opaque.

A second portion of the slurry which had been boiled for three hours was directly filtered, washed, dried, and the thus recovered pigment evaluated as a tinting material in a transparent lacquer with an opaque white. A most desirable peach tint was obtained. It was found to be 25% stronger in coloring value than a 50–50 mixture of commercial medium chrome yellow and opaque red iron oxide.

*Example 6*

A portion of the stock slurry of the pigment intermediate of Example 5 was boiled for 1½ hrs. The hot solution was then stirred with sufficient of a 15% solution of saponified castor oil and a cationic wetting agent to coat the particles and then with sufficient sulfuric acid to reduce the pH of the slurry to 6.0. The resulting slurry was filtered and the thus recovered pigment washed and dried. This coated pigment was incorporated into a transparent lacquer, the weight of the pigment being about 5% of the solids content of the lacquer. From this lacquer a film was obtained which was transparent and which had a pleasing orange-red color. The color of this film remained stable at 100° C.

*Example 7*

The pH of a portion of the stock slurry of Example 5 was raised to 11 by the addition of NaOH. On boiling for two hours, yellow goethite pigment was obtained.

*Example 8*

188 g. of copperas dissolved to one liter at 25° C. was added to 143 g. of soda ash which had been dissolved to one liter at 25° C. The mixture was heated to 40° C. and aerated at that temperature for three hours, when conversion of the ferrous material to ferric was substantially complete. The resulting slurry was boiled for two hours and yellow goethite pigment formed.

*Example 9*

214 g. of copperas is dissolved to two liters with water at 30° C. and the procedure repeated with 170 g. of sodium bicarbonate. The two solutions are mixed, the copperas solution being poured into the bicarbonate solution, and the mixture aerated for 1½ hours at 30°–35° C., followed by boiling for one hour. The yellow pigment is obtained.

I claim:

1. A method of producing a crystalline iron oxide pigment which comprises: forming an aqueous solution of a soluble ferrous salt; forming an aqueous solution of an alkali metal carbonate more than stoichiometrically equivalent to said ferrous salt; adding said ferrous salt solution to said carbonate solution at a temperature below 45° C.; oxidizing the ferrous content of the mixture below 45° C.; and heating the slurry which results to above 80° C. until conversion is substantially complete.

2. A method according to claim 1 wherein the ferrous salt is ferrous sulfate.

3. A method according to claim 1 wherein the alkali metal carbonate is a sodium carbonate.

4. A method according to claim 1 wherein the alkali metal carbonate is sodium bicarbonate.

5. A process according to claim 1 wherein the oxidizing agent is air.

6. A process according to claim 1 wherein the temperature to which the conversion is effected is about 100° C.

7. A process according to claim 1 wherein the oxidizing agent is air and the oxidization is performed in the presence of a chemically inert surface active agent.

8. A method of producing crystalline pigmentary goethite having a yellow shade which comprises forming an aqueous solution of a soluble ferrous salt; forming an aqueous solution of an alkali metal carbonate more than stoichiometrically equivalent to said ferrous salt; adding said ferrous salt solution to said carbonate solution at a temperature of below 45° C.; oxidizing the ferrous content of the mixture between about 25° and 45° C.; and heating the slurry which results to above 80° C. until fortion of pigmentary goethite is substantially complete.

9. A process according to claim 8 wherein the ferrous salt is ferrous sulfate, and the concentration of said sulfate in said solution is equivalent to about 50 to 70 g./l. of FeOOH.

10. A process according to claim 9 wherein the carbonate is a sodium carbonate and the amount of said carbonate is equivalent to at least 125% of the stoichiometric amount of said sulfate.

11. A process according to claim 10 wherein the oxidation agent is air.

12. A process according to claim 11 wherein the temperature at which the slurry is heated is its boiling point.

13. A method of producing crystalline pigmentary goethite having a yellow shade which comprises forming an aqueous solution of a soluble ferrous salt; forming an aqueous solution of an alkali metal carbonate more than stoichiometrically equivalent to said ferrous salt; adding said ferrous salt solution to said carbonate solution at a temperature below 45° C., oxidizing the ferrous content of the mixture; adjusting the pH of the slurry to at least about 11, and heating the slurry which results to above 80° C. until formation of pigmentary goethite is substantially complete.

14. A method of producing a crystalline pigmentary hematite having a red shade which comprises substantially freeing a stable solution of a soluble ferrous salt from particles including colloidal particles, the concentration of said salt in said solution being equivalent to at least about 80 g./l. of FeOOH; forming an aqueous solution of an alkali metal carbonate more than stoichiometrically equivalent to said ferrous salt; adding said ferrous salt solution to said carbonate solution at a temperature below 25° C.; oxidizing the ferrous content of the mixture below 25° C.; and heating the slurry which results to above 80° C. until formation of pigmentary hematite is substantially complete.

15. A method according to claim 14 wherein the ferrous salt is ferrous sulfate; the concentration of ferrous sulfate in said solution is equivalent to about 150 g./l. of FeOOH and the pH of the solution is about 2.0.

16. A process according to claim 15 wherein the alkali metal carbonate is a sodium carbonate and the proportion of said carbonate is at least 125% of the stoichiometric equivalent to said ferrous salt.

17. A process according to claim 16 wherein the oxidizing agent is air.

18. A process according to claim 17 wherein the temperature at which the slurry is heated is about the boiling point thereof.

19. A process according to claim 18 wherein the oxidation is effected in the presence of a chemically unreactive surface active agent.

References Cited in the file of this patent

UNITED STATES PATENTS

| Number | Name | Date |
|---|---|---|
| 1,327,061 | Penniman et al. | Jan. 6, 1920 |
| 1,337,402 | Hemingway | Apr. 20, 1920 |
| 1,368,748 | Penniman et al. | Feb. 15, 1921 |
| 1,392,926 | Fireman | Oct. 11, 1921 |
| 1,832,417 | O'Brien | Nov. 17, 1931 |
| 2,111,727 | Plews | Mar. 22, 1938 |
| 2,127,907 | Fireman | Aug. 23, 1938 |
| 2,335,760 | Hucks | Nov. 30, 1943 |
| 2,357,096 | Fireman | Aug. 29, 1944 |
| 2,384,579 | Vesce | Sept. 11, 1945 |
| 2,558,303 | Marcot et al. | June 26, 1951 |

FOREIGN PATENTS

| Number | Country | Date |
|---|---|---|
| 299,919 | Great Britain | Nov. 8, 1928 |
| 313,999 | Great Britain | June 21, 1929 |

OTHER REFERENCES

Mellor, "Comprehensive Treatise on Inorganic and Theoretical Chemistry," vol. 13, page 838, 1934, Longman, Green and Co., New York city.

Welo et al., "Chemical Reviews," vol. 15, pages 45, 46, August 1934.